United States Patent
Wu et al.

(10) Patent No.: US 6,813,675 B2
(45) Date of Patent: Nov. 2, 2004

(54) CHIPSET WITH LPC INTERFACE AND DATA ACCESSING TIME ADAPTING FUNCTION

(75) Inventors: Chun-Cheng Wu, Shindian (TW); Chia-Chun Lien, Taipei (TW)

(73) Assignee: Via Technologies, Inc., Taipei (TW)

( * ) Notice: Subject to any disclaimer, the term of this patent is extended or adjusted under 35 U.S.C. 154(b) by 410 days.

(21) Appl. No.: 10/112,735

(22) Filed: Apr. 2, 2002

(65) Prior Publication Data

US 2003/0078984 A1 Apr. 24, 2003

(30) Foreign Application Priority Data

Oct. 24, 2001 (TW) ........................................ 90126217 A (51) Int. Cl.$^7$ ............................. G06F 3/00; G06F 9/00; G06F 12/00; G06F 13/00; G06F 17/00
(52) U.S. Cl. ....................... 710/315; 710/306; 713/502; 711/167
(58) Field of Search ............................... 710/315, 62–65, 710/72, 100, 300, 110, 322, 33, 306, 308; 711/154, 167; 712/32, 37; 709/208; 713/502

(56) References Cited

U.S. PATENT DOCUMENTS

| | | | | |
|---|---|---|---|---|
| 5,991,841 A | * | 11/1999 | Gafken et al. | ............... 710/104 |
| 6,119,189 A | * | 9/2000 | Gafken et al. | ............... 710/110 |
| 6,134,605 A | * | 10/2000 | Hudson et al. | ............... 710/13 |
| 6,170,027 B1 | * | 1/2001 | Lu et al. | ............... 710/65 |
| 6,286,097 B1 | * | 9/2001 | Chang et al. | ............... 713/2 |

OTHER PUBLICATIONS

"A RISC processor for embedded applications within an ASIC" by Roberts, C.E. (abstract only) Publication date: Oct. 1991.*

"Control development for mechatronic systems with a fully reconfigurable pipeline architecture" by Rettberg, A.; Zanella, M.; Lehmann, T.; Dierkes, U.; Rustemeier, C. (abstract only) Publication Date: Sep. 8–11, 2003.*

* cited by examiner

Primary Examiner—Gopal C. Ray
(74) Attorney, Agent, or Firm—Rosenberg, Klein & Lee (57) ABSTRACT

A chipset with LPC interface and data accessing time adapting function is proposed. The chipset comprises an LPC slave controller connected to an LPC master controller in a main controller, a LPC/ISA bridge connected to the LPC slave controller and convert a data in LPC specification to a data in ISA specification, a plurality of ISA logic control units connected to the LPC/ISA bridge and controlling corresponding ISA devices, and a data accessing time adjuster connected to the LPC/ISA bridge and adjusting the time of accessing operation for an ISA or LPC device.

16 Claims, 10 Drawing Sheets

CHIPSET WITH LPC INTERFACE AND DATA ACCESSING TIME ADAPTING FUNCTION

FIELD OF THE INVENTION

The present invention relates to a chipset with LPC interface, especially to a chipset with LPC interface and data accessing time adapting function.

BACKGROUND OF THE INVENTION

The conventional ISA (Industry Standard Architecture) interface becomes obsolete and insufficient as the requirement of transmission bandwidth becomes more demanding. The ISA interface has low operation clock rate and high pin counts (such as 60 pins) as compared with other advanced interface. Therefore, the peripheral connected to ISA slot has larger area and small data bandwidth. To overcome this problem, a new interface, namely, LPC (low pin counts) interface is developed. The LPC interface has higher clock rate of 33 MHz and smaller pin counts (below 10 pins). Therefore, the adaptor card and slot for LPC interface have compact size and lower price.

Figure 1:
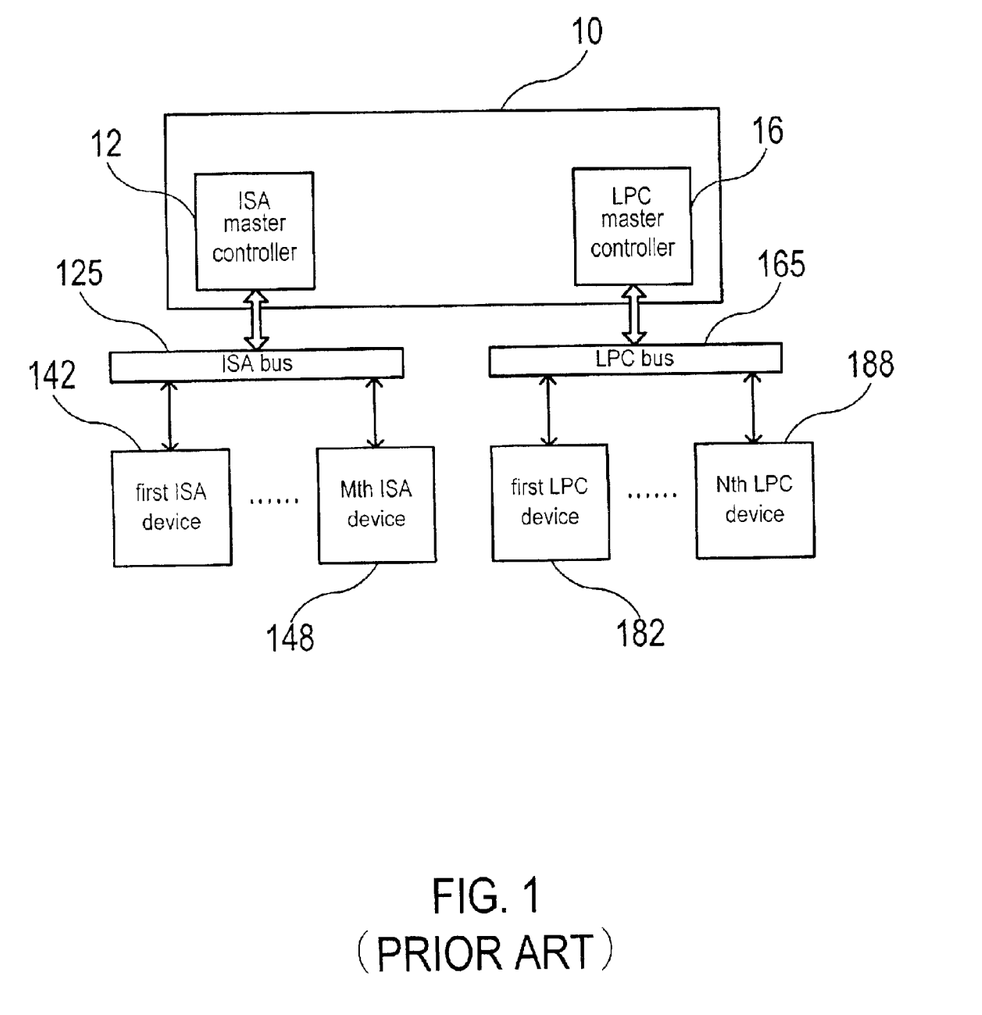
FIG. 1 shows a block diagram of a conventional controller chip.

On the other hand, there are still many low-speed peripherals connected to computer through ISA interface. FIG. 1 shows a conventional controller chip to solve this problem. The controller chip 10 comprises an ISA master controller 12 and an LPC master controller 16. The ISA master controller 12 controls a plurality of ISA devices such as a first ISA device 142 to an $M_{th}$ ISA device 148 through an ISA bus 125. The LPC master controller 16 controls a plurality of LPC devices such as a first LPC device 182 to an $N_{th}$ LPC device 188 through an LPC bus 165. However, in this scheme, both ISA master controller 12 and LPC master controller 16 are required. The extra pin count imposes difficulty to chip design and motherboard layout.

Figure 2:
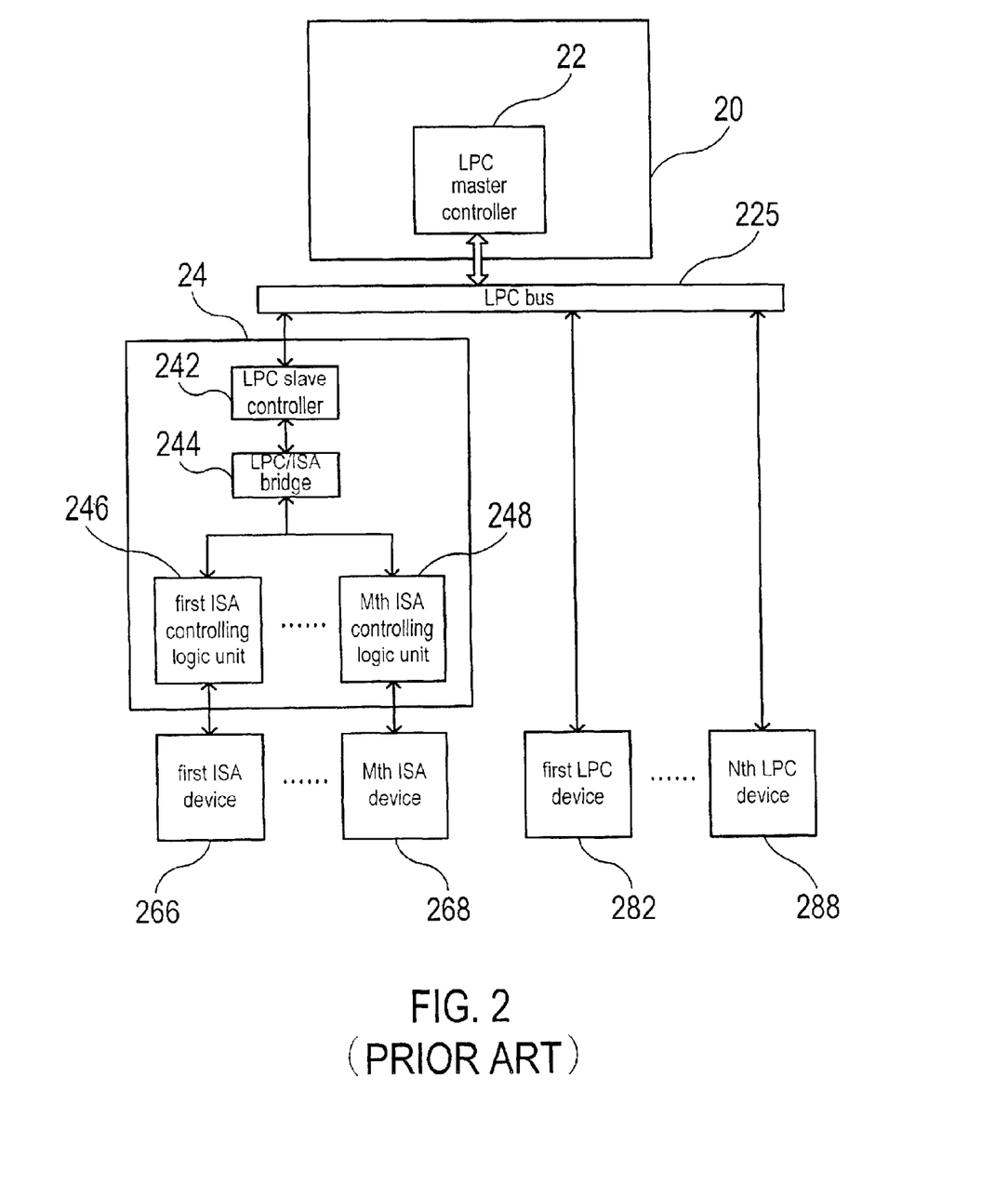
FIG. 2 shows a block diagram of another conventional controller chip.

FIG. 2 shows the block diagram of an improved controller chip 20. The controller chip 20 comprises an LPC master controller 22 controlling a plurality of LPC devices such as a first LPC device 282 to an $N_{th}$ LPC device 288 through an LPC bus 225. The system further comprises a super I/O chip 24 to control ISA devices with lower clock rate, which include a first ISA device 266 to an $M_{th}$ ISA device 268. The super I/O chip 24 comprises an LPC slave controller 242 connecting to the LPC master controller 22 through the LPC bus 225. The super I/O chip 24 further comprises a plurality of ISA controlling logic units including a first ISA controlling logic unit 246 to an $M_{th}$ ISA controlling logic unit 248 in order to control the first ISA device 266 to the $M_{th}$ ISA device 268, respectively. Every one of the ISA controlling logic units is connected to the LPC slave controller 242 through an LPC/ISA bridge 244. The LPC/ISA bridge 244 is functioned to adapt the signals in LPC format from the LPC master controller 22 into ISA format.

The LPC bus is generally operated at 33 MHz, which is much higher than 8 MHz cock rate of the ISA bus. Therefore, the data accessing time in LPC interface specification such as accessing time for I/O read, I/O write, memory read, memory write, DMA (direct memory access) read/write may be shorter than the data accessing time in ISA interface specification. The cycle numbers of wait state of the signals in LPC format should be prolonged when the signals in LPC format are adapted into ISA format. Therefore, the adapted ISA data has more clock cycles than the original LPC data. However, low-speed peripherals such as printer and disk driver need more clocks for data transmission, it would have transmission problem when the clock cycle number is not sufficient. Moreover, the transmission efficiency is degraded when the cycle number is excessive.

SUMMARY OF THE INVENTION

It is an object of the present invention to provide a chipset with LPC interface and data accessing time adapting function, wherein a data accessing time adjuster is provided in the LPC/ISA bridge of the inventive chipset. The data accessing time adjuster adjust accessing time in view of particular ISA or LPC devices.

It is another object of the present invention to provide a chipset with LPC interface and data accessing time adapting function, wherein the data accessing time adjuster comprises a register to record the required time of accessing operation for the ISA or LPC device.

It is still another object of the present invention to provide a chipset with LPC interface and data accessing time adapting function, wherein numbers of wait state cycles is added in the accessing operation to control the accessing time.

It is still another object of the present invention to provide a chipset with LPC interface and data accessing time adapting function, wherein a counter is provided to control the accessing time.

The various objects and advantages of the present invention will be more readily understood from the following detailed description when read in conjunction with the appended drawing, in which:

DETAILED DESCRIPTION OF THE INVENTION

Figure 3:
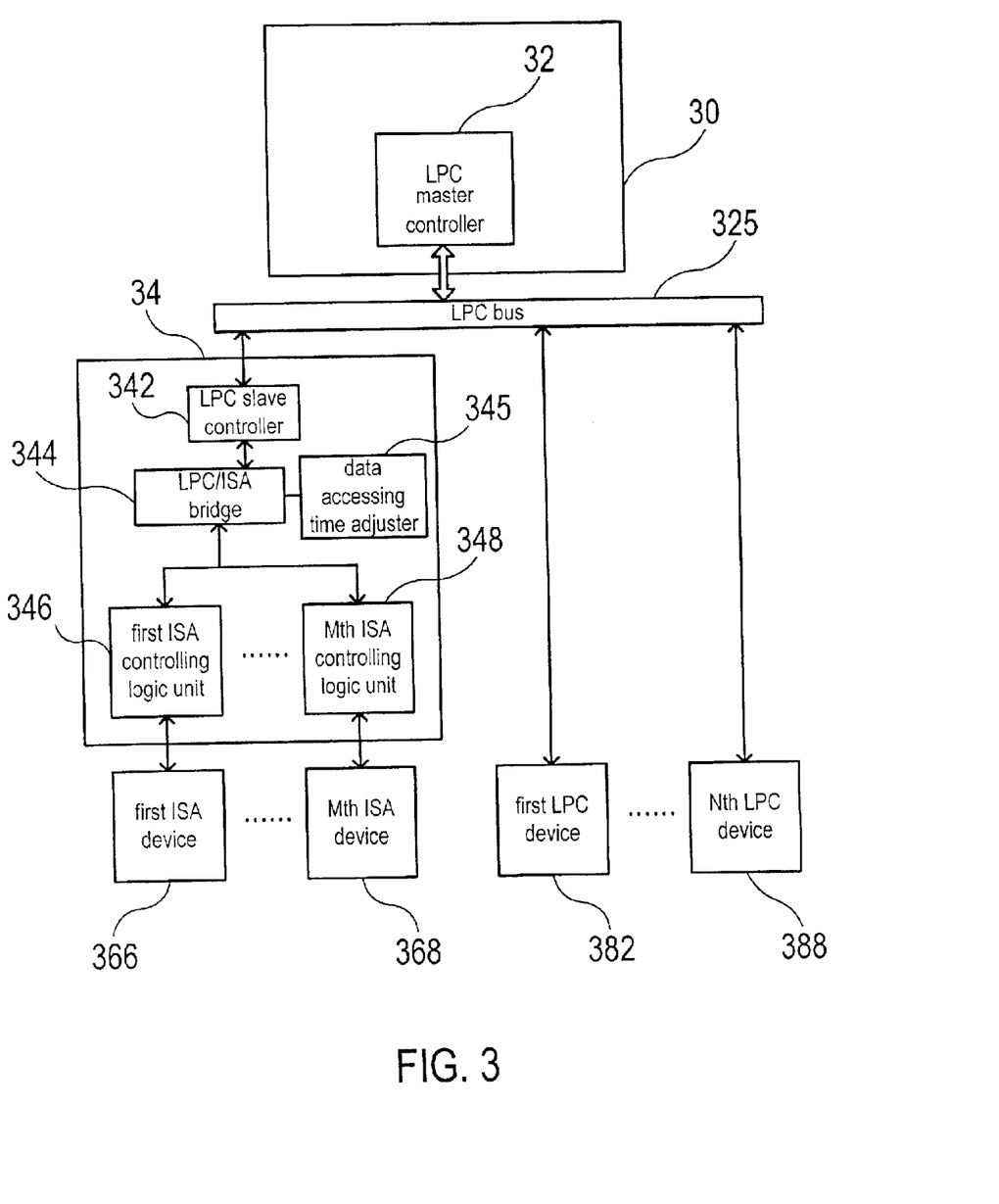
FIG. 3 shows a block diagram of the chipset with LPC interface according to a preferred embodiment of the present invention.

FIG. 3 shows the block diagram of the chipset with LPC interface according to the first preferred embodiment of the present invention. The main controller 30 comprises an LPC master controller 32 controlling a plurality of LPC devices such as a first LPC device 382 to an $N_{th}$ LPC device 388 through an LPC bus 325. The main controller 30 connected to a plurality of ISA devices including a first ISA device 366 to an $M_{th}$ ISA device 368 through an inventive chip 34.

The chip 34 comprises at least an LPC slave controller 342, an LPC/ISA bridge 344, a plurality of ISA controlling logic units and a data accessing time adjuster 345. The LPC slave controller 34 is connected to the LPC master controller 32 through the LPC bus 325. The LPC/ISA bridge 344 is connected to the LPC slave controller 342 and functioned to adapt the signals in LPC format into ISA format. The LPC/ISA bridge 344 is further connected to the plurality of ISA controlling logic units including a first ISA controlling logic unit 346 to an $M_{th}$ ISA controlling logic unit 348 in order to control the first ISA device 366 to the $M_{th}$ ISA device 368, respectively. The data accessing time adjuster 345 can automatically control the accessing time according to bandwidth requirement of the ISA device.

The data accessing time adjuster 345 further comprises a register (not shown) to record a specific time for accessing process of an ISA device. After the LPC/ISA bridge 344 decodes a data in LPC format from the LPC slave controller 342, the data accessing time adjuster 345 identifies the ISA device to be accessed in view of the accessing command and operation contained in the decoded data. Therefore, the accessing time for the ISA device can be optimally assigned to the ISA device.

Moreover, the register can be stored with predetermined cycle number of wait state for specific ISA devices. When the LPC/ISA bridge 344 decodes a data in LPC format from the LPC slave controller 342, the data accessing time adjuster 345 identifies the ISA device and applies suitable cycles of wait state to the decoded data to prolong data accessing time.

The data accessing time adjuster 345 preferably comprises a counter (not shown) to count cycle number and a register (not shown) to record a specific numeric number corresponding to the accessing process of an ISA device. After the data accessing time adjuster 345 acquires a numeric number corresponding to the accessing process of an ISA device, the wait state lasting time is determined by the counter counting increasingly from a starting number such as zero and until the counting number being the numeric number. Alternatively, the wait state lasting time is determined by the counter counting decreasingly from the numeric number until the counting number is zero.

Figure 4:
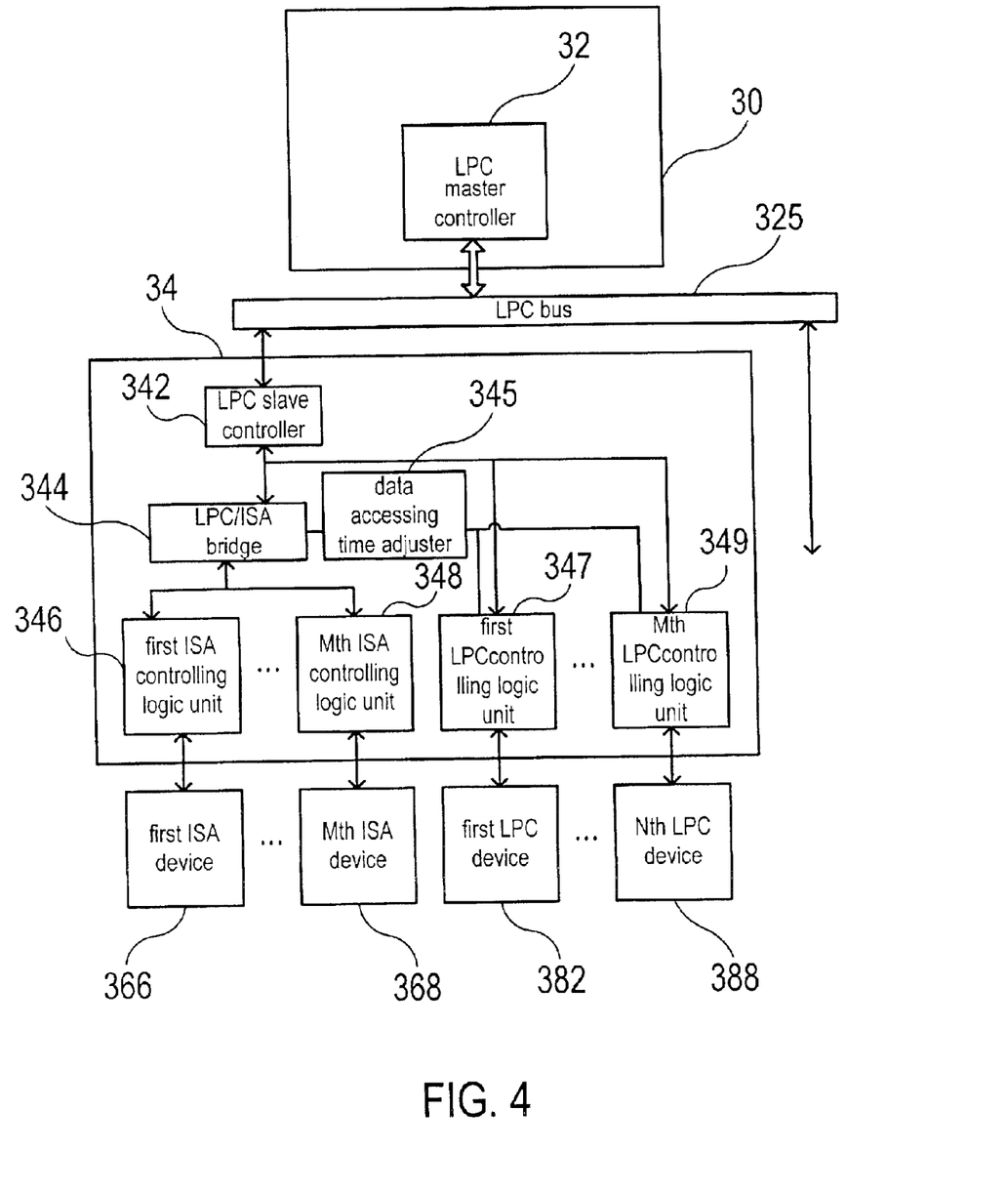
FIG. 4 shows a block diagram of the chipset with LPC interface according to another preferred embodiment of the present invention.

FIG. 4 shows the block diagram of the chipset with LPC interface according to another preferred embodiment of the present invention. The main controller 30 further comprises a plurality of LPC controlling logic units including a first LPC controlling logic unit 347 to an $N_{th}$ LPC controlling logic unit 349 in order to control the first LPC device 382 to the $N_{th}$ ISA device 388, respectively. The LPC controlling logic units are connected to the LPC slave controller 342 and the data accessing time adjuster 345. More particularly, the LPC controlling logic units receive data from the LPC master controller 32 through the LPC bus 325 and the LPC slave controller 342. The data accessing time adjuster 345 can also adjust the cycle number for accessing the LPC controlling logic units, whereby the data integrity and transmission efficiency can be ensured.

In above preferred embodiments, the LPC master controller 32 can be integrated into one of a north bridge chip and a south bridge chip. Moreover, the main controller 30 can be one of a north bridge chip and a south bridge chip. The register of the data accessing time adjuster 345 is a programmable memory such that the main controller 30 can be adapted for ISA devices of various manufacturers. Moreover, the data accessing time adjuster 345 can be a state controller to automatically adjust the lasting time of wait state and prolonging data accessing time.

Figure 5:
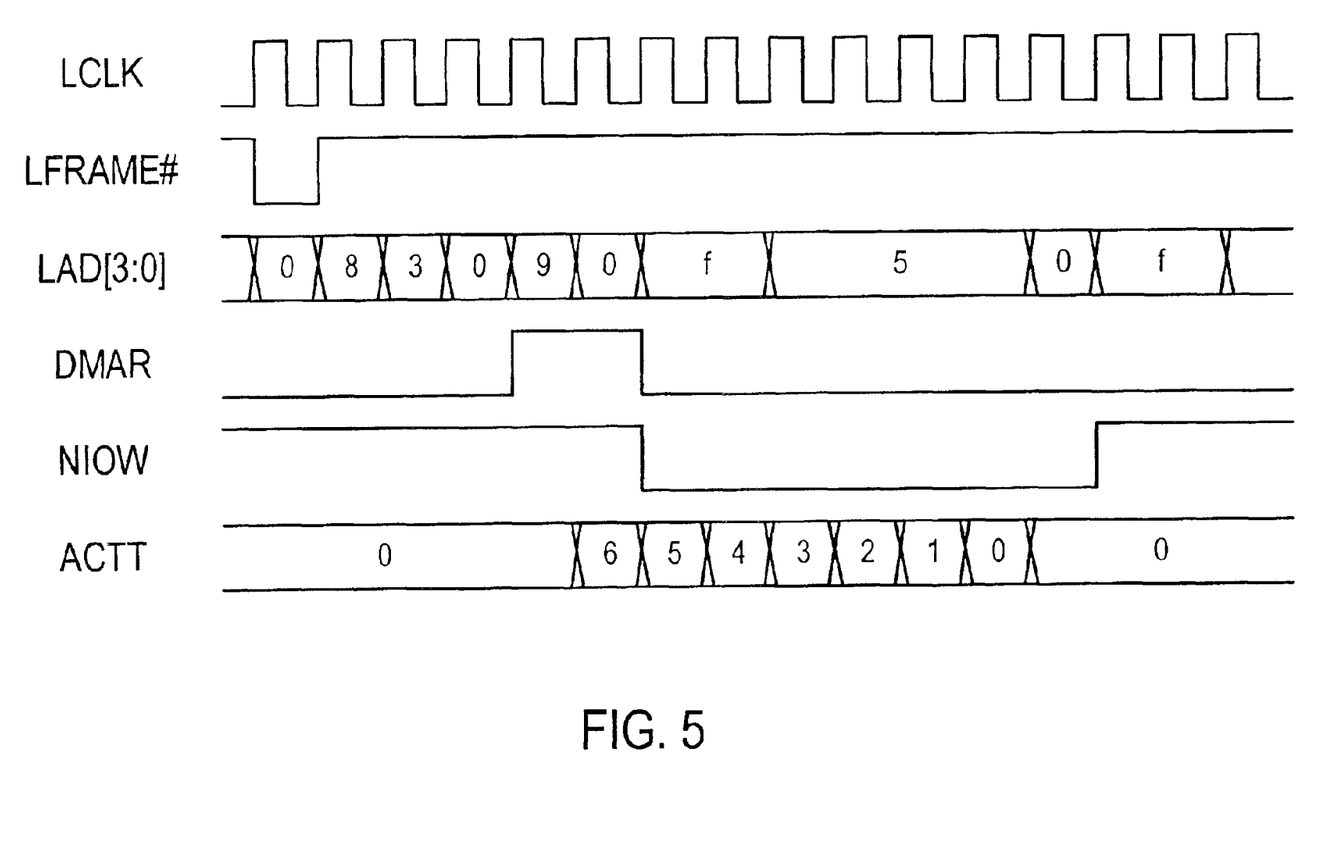
FIG. 5 shows a timing diagram of DMA read operation according to a preferred embodiment of the present invention.

FIGS. 5 to 10 show the timing diagram of DMA read, DMA write, I/O read, I/O write, memory read and memory write operation according to the first preferred embodiment of the present invention. In the present invention, the data transmission scheme can be one of DMA read, DMA write, I/O read, I/O write, memory read and memory write operation. FIG. 5 shows the timing diagram of DMA read, wherein a data is read from a memory and written to a designated I/O device (such as an ISA device). The LPC master controller 32 firstly issues an LFRAME control signal indicating the onset of the read/write cycle for an LPC bus. The LPC/ISA bridge 344 decodes a data signal (from the LAD [3:0] signal lines) in LPC format from the LPC slave controller 342 and recognizes the beginning of accessing operation (start, 0), communicate cycle type and direction for cycle (CYCTYPE+DIR) being DMA read (8), accessing channel being channel 3 (3), and data size being 8 bit (0). The DMA read signal (DMAR) then rises and lasts for two clocks (LCLK) and the LAD [3:0] signal lines transmit data (9, 0) at this two clocks simultaneously. Afterward, the bus is turning control over (Turn-Around) to the designated I/O device by two clocks (f) and the transmission signal NIOW of the designated I/O device continues for 7 clocks. In LPC specification, the time for turning-around is 2 clocks and the time for SYNC signal is 1 clock for DMA read. The wait time is insufficient for the designated I/O device as can be manifest to the length of the NIOW signal (7 cycles). Therefore, four clock cycles of wait state (5) are added to the data signal (LAD [3:0]) to prolong the transmiting time (5) for the designated I/O device. The sum of the time for turing-around and the wait time is compatible with the NIOW signal to ensure successful data transmission. Afterward, the read cycle is ended on the LAD [3:0] lines with a tuning-around (f).

Figure 6:
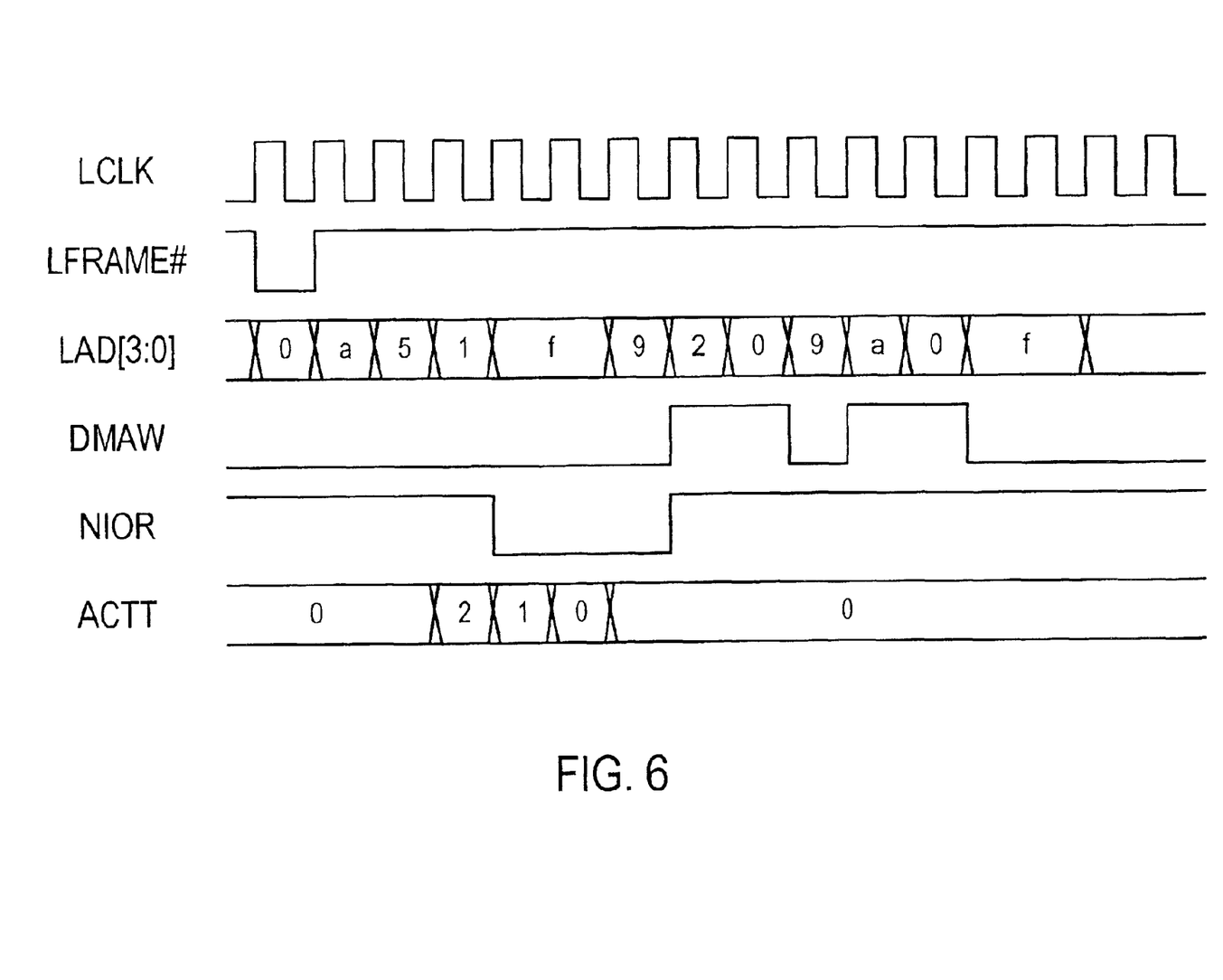
FIG. 6 shows a timing diagram of DMA write operation according to a preferred embodiment of the present invention.

FIG. 6 shows the timing diagram of DMA write, wherein a data is read from a designated I/O device and written to a memory. As shown in this figure, the LPC master controller 32 firstly issues an LFRAME control signal indicating the onset of the read/write cycle for an LPC bus. The LPC/ISA bridge 344 decodes a data signal (from the LAD [3:0] signal lines) in LPC format from the LPC slave controller 342 and recognizes the beginning of accessing operation (start, 0), CYCTYPE+DIR being DMA write (a), accessing channel being channel 5 (5), and data size being 16 bit (1). Afterward, the bus is turing-around to the designated I/O device by two clocks (f) and the transmission signal NIOR of the designated I/O device continues for 3 clocks. The DMA write signal (DMAW) rises after read operation from the designated I/O device is finished (end of the transmission signal NIOR). The signal lines LAD [3:0] transmit data (2, 0) and (a, 0) after an SYNC signal (9), then the read cycle is ended with a turning-around (f).

In this case, the read operation from the designated I/O device requires 3 clock cycles. The DMA read operation for 16 bit data requires 4 clocks (2 clocks for turning-around and 2 clocks for SYNC) in LPC specification. The period of 4 clocks is sufficient for the data transmission of the designated I/O device and no extra wait state is required. More particularly, the counter (ACCT) begins counting at one clock before the turning-around (f) and begins at numeric of 2 in decreasing fashion. The counting is decreased to zero just before the data transmission of the designated I/O device. Therefore, no extra wait state is required.

Figure 7:
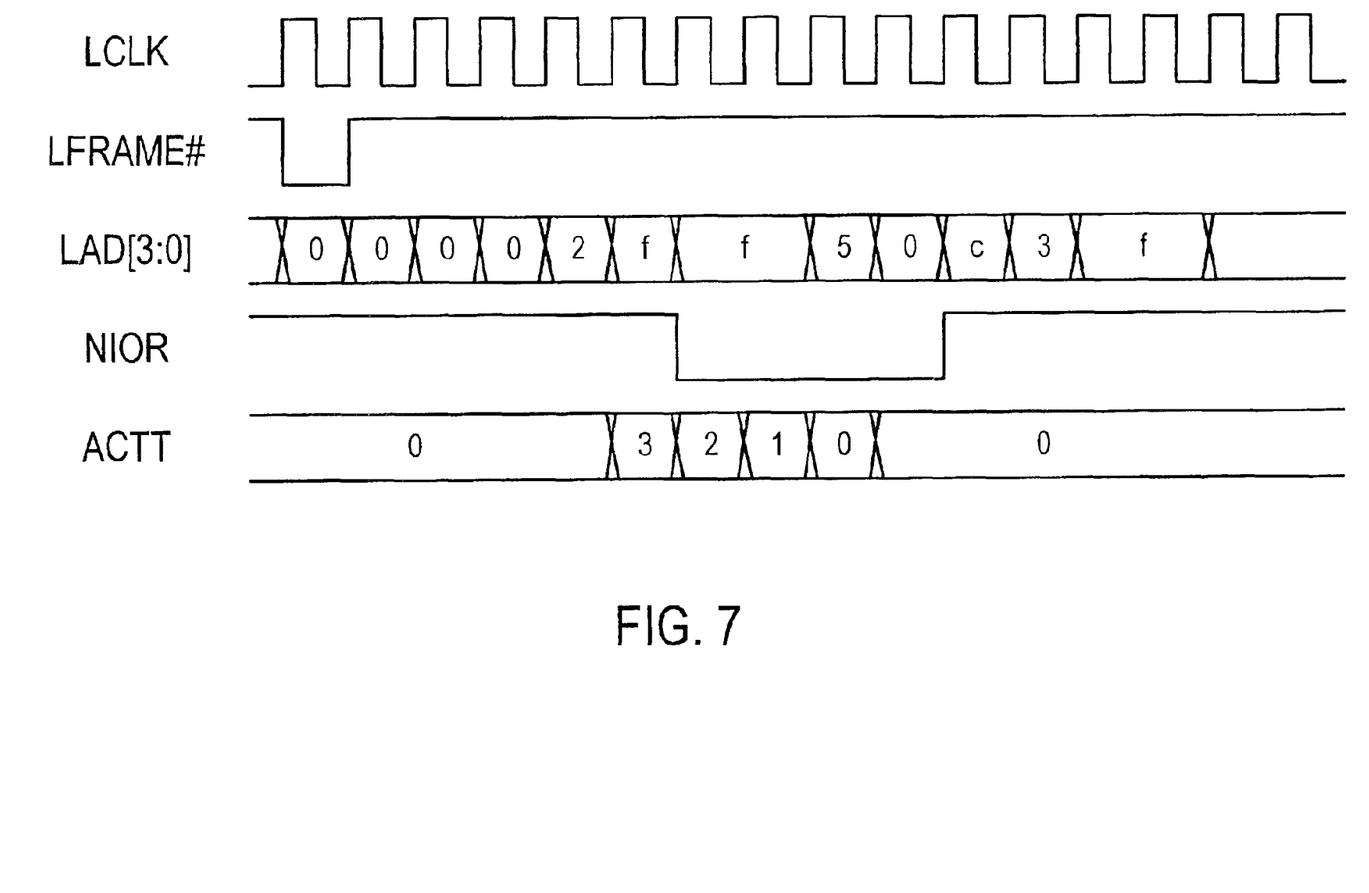
FIG. 7 shows a timing diagram of I/O read operation according to a preferred embodiment of the present invention.

FIG. 7 shows the timing diagram of I/O read according to a preferred embodiment of the present invention. The LPC master controller 32 firstly issues an LFRAME control signal indicating the onset of the read/write cycle for an LPC bus. The LPC/ISA bridge 344 decodes a data signal (LAD [3:0]) in LPC format from the LPC slave controller 342 and recognizes the beginning of accessing operation (0), CYCTYPE+DIR being I/O read (0), accessing address being 002f. Afterward, the bus is turning-around to the designated I/O device by two clocks (f) and the transmission signal NIOR of the designated I/O device continues for 4 clocks.

The I/O read operation requires 3 clocks (2 clocks for turning-around and 1 clocks for SYNC) in LPC specification. Therefore, an extra wait state (5) of 1 clock cycle is required. More particularly, the counter ACCT begins counting at one clock before turning-around (f) and begins at numeric of 3 in decreasing fashion. The counting is decreased to zero just before the data transmission of the designated I/O device in case that an extra wait state of 1 clock cycle is appended. The LAD [3:0] signal lines transmit data (c, 3), and then the read cycle is ended with a turning-around (f).

Figure 8:
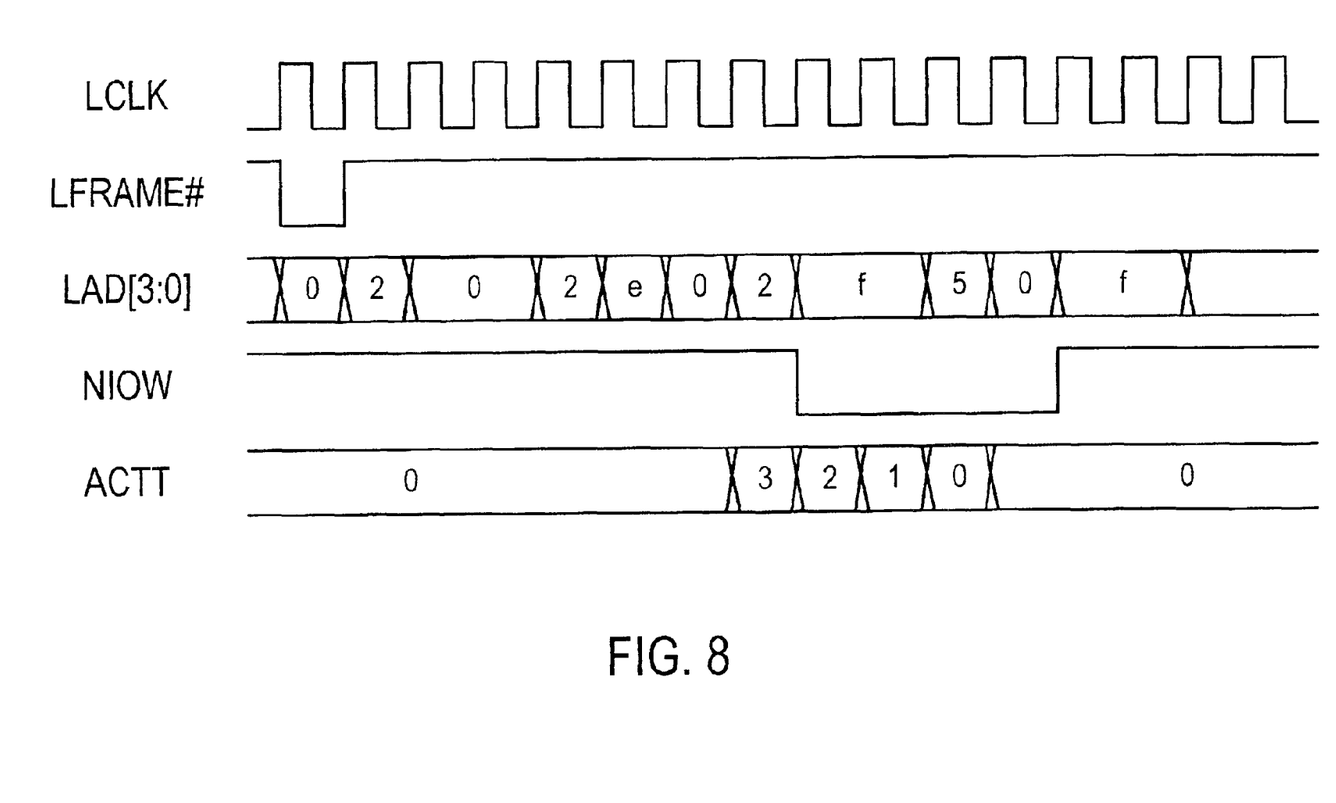
FIG. 8 shows a timing diagram of I/O write operation according to a preferred embodiment of the present invention.

FIG. 8 shows the timing diagram of I/O write according to a preferred embodiment of the present invention. The designated I/O device requires accessing time of 4 clocks. Nevertheless, the I/O write operation requires 3 clocks (2 clocks for turning-around and 1 clock for SYNC) in LPC specification. Therefore, an extra wait state (5) of 1 clock cycle is required. More particularly, the counter ACCT begins counting at one clock before turning-around (f) and begins at numeric of 3 in decreasing fashion. The counting is decreased to zero just before the data transmission of the designated I/O device in case that an extra wait state of 1 clock cycle is appended.

Figure 9:
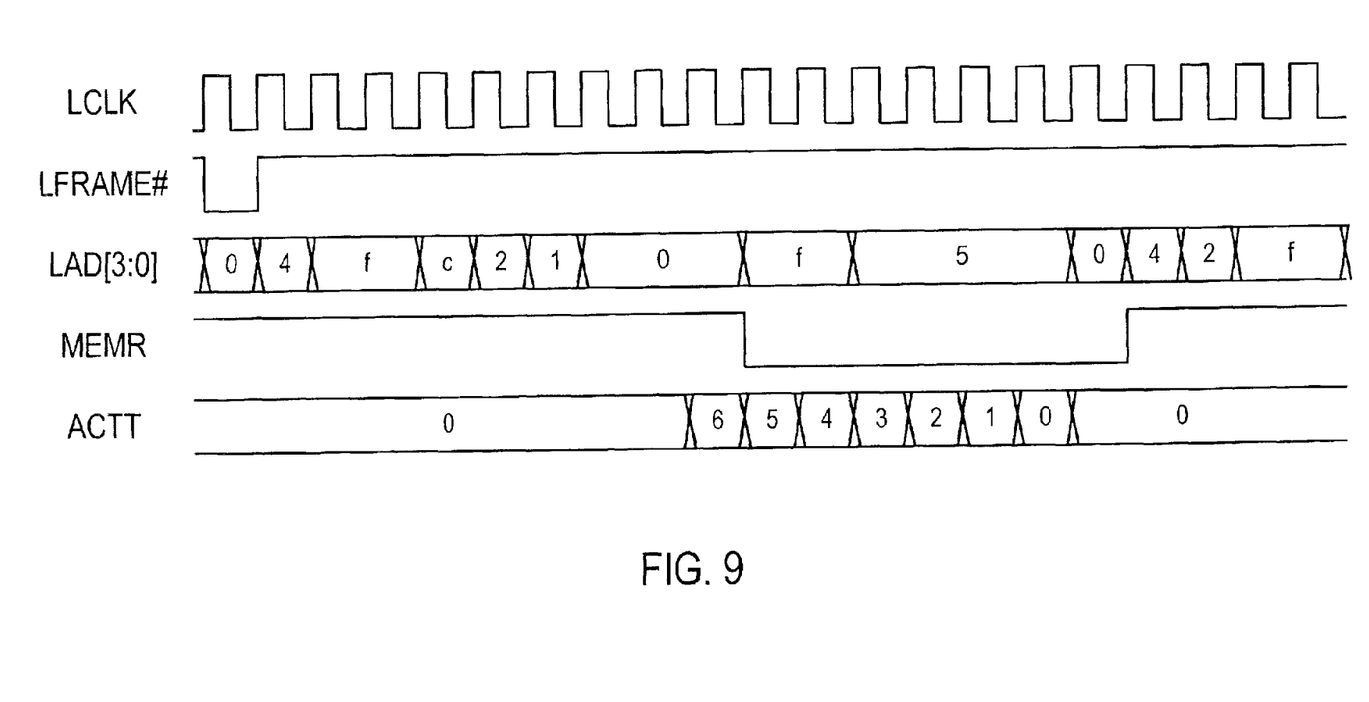
FIG. 9 shows a timing diagram of memory read operation according to a preferred embodiment of the present invention.
Figure 10:
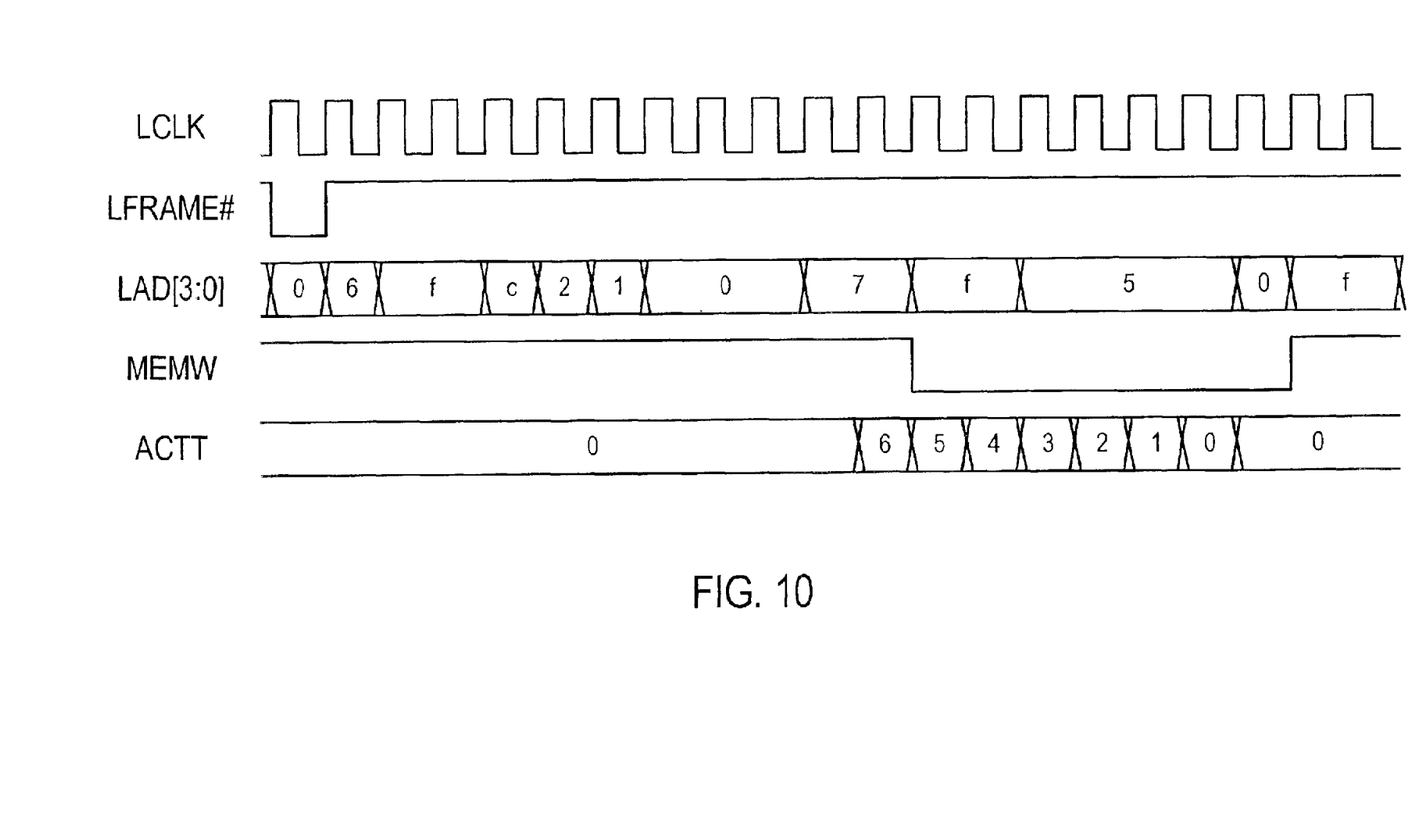
FIG. 10 shows a timing diagram of memory write operation according to a preferred embodiment of the present invention.

FIGS. 9 and 10 show the timing diagram of memory read and memory write operation according to a preferred embodiment of the present invention. The memory read/write operation requires accessing time of 7 clocks. Nevertheless, the memory read/write operation requires 3 clocks (2 clocks for turning-around and 1 clock for SYNC) in LPC specification. Therefore, an extra wait state (5) of 4 clocks is required. More particularly, the counter ACCT begins counting at one clock before turning-around (f) and begins at numeric of 6 in decreasing fashion. The counting is decreased to zero just before the data transmission of the memory read/write operation in case that an extra wait state of 4 clocks is appended.

To sum up, the present invention provides a chipset with LPC interface and data accessing time adapting function, wherein a data accessing time adjuster is provided in the LPC/ISA bridge of the inventive chipset. The data accessing time adjuster adjust the data accessing time in view of particular ISA devices, whereby the data can be efficiently and correctly transmitted.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A chipset with LPC interface and data accessing time adapting function, comprising:
    a slave controller with a first interface and connected to a master controller with said first interface in a main controller;
    a first/second interface bridge connected to said slave controller with said first interface and functioned to convert a data in specification of said first interface to a data in specification of a second interface;
    a plurality of logic control units with said second interface, said logic control units connected to said first/second interface bridge and controlling corresponding devices with said second interface;
    a data accessing time adjuster connected to said first/second interface bridge and adjusting time of accessing operation for a device with said second interface.

2. The chipset with LPC interface as in claim 1, wherein said first interface is an LPC interface.

3. The chipset with LPC interface as in claim 1, wherein said second interface is an ISA interface.

4. The chipset with LPC interface as in claim 1, wherein said main controller can be one of a north bridge chip and a south bridge chip.

5. The chipset with LPC interface as in claim 1, wherein said data accessing time adjuster further comprises a register to record said time of accessing operation for said device with said second interface.

6. The chipset with LPC interface as in claim 5, wherein said accessing operation can be one of the DMA read, DMA write, I/O read, I/O write, memory read, memory write operation and the combination thereof.

7. The chipset with LPC interface as in claim 5, wherein said register for recording said time of accessing operation for said device with said second interface is programmable.

8. The chipset with LPC interface as in claim 1, wherein said data accessing time adjuster inserts a number of clock cycles of wait state to change said time of accessing operation for said device with said second interface.

9. The chipset with LPC interface as in claim 8, wherein said data accessing time adjuster further comprises a register to record said number of clock cycles of wait state of accessing operation for said device with said second interface.

10. The chipset with LPC interface as in claim 9, wherein said recorder for recording said number of clock cycles of wait state is programmable.

11. The chipset with LPC interface as in claim 1, wherein said data accessing time adjuster further comprises a counter to control said number of clock cycles of accessing operation for said device with said second interface.

12. The chipset with LPC interface as in claim 11, wherein said data accessing time adjuster further comprises a register to record a numeric corresponding to accessing operation for said device with said second interface.

13. The chipset with LPC interface as in claim 12, wherein said register for recording said numeric corresponding to accessing operation for said device with said second interface is programmable.

14. The chipset with LPC interface as in claim 1, wherein said data accessing time adjuster is a state controller.

15. The chipset with LPC interface as in claim 1, further comprises at least one logic control units with said first interface, said logic control units with said first interface connected to said slave controller with said first interface and controlling corresponding devices with said first interface.

16. The chipset with LPC interface as in claim 15, wherein said logic control units with said first interface are connected to said data accessing time adjuster and said data accessing time adjuster adjusting said time of accessing operation for said device with said first interface.

* * * * *